June 5, 1951  J. C. TATUM  2,555,715
COLORED REFLEX LIGHT REFLECTOR
Filed Sept. 13, 1947
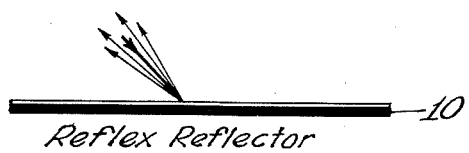
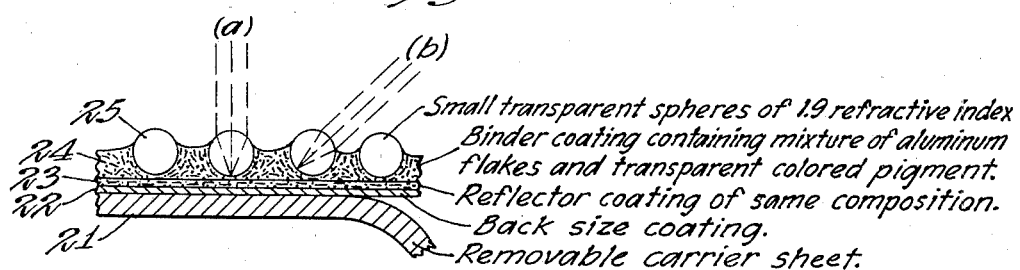
INVENTOR.
BY John C. Tatum
Carpenter Abbott Coulter & Kinney,
his attorneys.

Patented June 5, 1951

2,555,715

UNITED STATES PATENT OFFICE 2,555,715

COLORED REFLEX LIGHT REFLECTOR

John C. Tatum, St. Paul, Minn., assignor to Minnesota Mining & Manufacturing Company, St. Paul, Minn., a corporation of Delaware Application September 13, 1947, Serial No. 773,840

5 Claims. (Cl. 88—82)

This invention relates to reflex light reflectors of the class having a catadioptric structure wherein a layer of minute transparent sphere lenses (glass beads) is partially embedded in a reflective binder layer. Such reflectors have the property of directing a brilliant cone of light back toward the source of an angularly incident beam of light (see Fig. 1). Road signs and markers of the reflex type have greater visibility at night to the occupants of an approaching vehicle, since the reflected light is concentrated in a narrow cone which automatically returns toward the headlights and occupants of the vehicle.

The present invention provides a new and useful colored type of reflex reflector arrangement which has a novel combination of structural optical elements so related as to provide high-brilliancy wide-angularity reflection properties. The reflector emits colored light of high brilliancy even when the incident beam of light strikes the sphere layer at a large angle from the perpendicular (normal), as viewed by persons near the axis of the incident beam.

This invention is based upon the discovery of the reflection characteristics produced by a layer of minute transparent spheres having a refractive index of approximately 1.9, when partially embedded in a reflective binder layer composed of a transparent film material containing a mixture of finely divided aluminum flake pigment and transparent color pigment. The reflection is produced by the aluminum flakes and the light-coloration is produced by particles of the transparent color pigment acting as minute color filters. The refractive index of the transparent color pigment is substantially equal to that of the transparent binder so as to minimize light-scattering and diffusion at the interfacial surfaces thereof. A refractive index of approximately 1.9 for the sphere lenses is needed to secure the desired color effect and this value also results in an optimum high-brilliancy wide-angularity characteristic. The correlation of variables will be subsequently discussed in more detail.

The reflector material can be fabricated in flexible, weatherproof, sheet form adapted for application to desired bases (including embossed sheet metal bases) in the making of highway signs and markers. The structure can also be built up by applying suitable coatings directly to a stiff base.

The invention can best be described and explained in connection with the accompanying illustrative diagrammatic drawings, wherein:

Fig. 1 shows in diagram form a reflex reflector sheet 10 and the concentrated cone of brilliant reflex-reflected light returning toward the source of an angularly incident ray or beam. The action is quite different from that of a mirror which causes specular reflection, and from that of a reflective diffusing surface which causes the reflected light to spread out in all directions.

Fig. 2 is a highly magnified diagram view showing the sectional structure of a flexible reflex reflector sheet embodying the invention. For greater clarity, the spheres are shown farther apart than the normal close-packed relation.

This illustrative sheet has a non-fibrous film construction which is self-sustaining but is temporarily attached to a removable carrier sheet 21 upon which the coatings are built up, and which can be peeled off when desired. The film structure has a back size coating 22, which is cast upon the carrier sheet and facilitates stripping, and which provides a smooth surface upon which is coated the back reflector film 23. Upon this is coated the reflective binder layer 24 in which is partially embedded a single surface layer of minute transparent spheres 25, having a refractive index of approximately 1.9, which have been pressed in while the binder coating was still in a plastic condition (before curing) so that the back extremities touch or closely approach the underlying back reflector film. This reflective binder layer, upon hardening, firmly holds the spheres in position and contacts the rearward surfaces thereof.

The back reflector coating 23, and the reflective binder coating 24, serve to provide a novel type of colored reflective material contiguous to the back surfaces of the sphere lenses. The combination constitutes a chromatic catadioptric optical structure which refracts, filters and reflects in such a manner as to produce the colored reflex-reflecting action previously described.

These reflective coatings are composed of a clear transparent film-forming body material containing a mixture of finely divided aluminum flake pigment and transparent color pigment. The aluminum flakes of the back reflector coating 23 tend to lie flat at the surface. The aluminum flakes of the binder coating 24, as a result of the entry of the spheres into this layer during the making operation, tend to be oriented so that they face toward the adjacent sphere surfaces. The two coatings thus provide minute flat silvery reflective surfaces facing and in close proximity to the rearward hemispherical surface of each sphere lens, but spaced therefrom. The transparent color pigment particles are minutely small compared to the aluminum flakes, and some of these particles lie scattered between each sphere surface and the adjacent flakes so as to filter the light rays both before and after reflection from the flakes. This filter action produces a color hue in the light rays transmitted through the particles, the degree of chroma (color intensity) depending upon the correlation of proportions.

Referring to Fig. 2, the light rays (a) represent substantially paraxial rays from a distant light source approaching the outer exposed face of a particular sphere in a direction normal to the plane of the reflector sheet. Owing to spherical and chromatic aberration effects, these incident rays cannot be brought to a true focus. But a sphere lens of refractive index approximating 1.9 will refract the rays so that they converge and strike the rear surface of the sphere within a small area zone, as shown. The rays proceed through the transparent material of the reflector (including the transparent color pigment particles) until reflected by the aluminum flakes, which occurs while the rays are closely focused and near the sphere surface. The reflected rays (except for those which are scattered) form a divergent cone of rays which are refracted at the front surface of the sphere so as to be concentrated in a narrow cone having substantially the same axis as the incident rays. The colored rays emitted from all of the spheres form a total cone of rays of limited divergency which proceeds toward the source of light. Persons located so that their lines of sight are close to the axis of the illuminating beam will see the reflector sheet as a brilliant colored area whose visibility far exceeds an ordinary painted sheet. The minute size of the spheres prevents distinguishing them and the reflector sheet appears as though continuously coated with a brilliant colored paint. Moreover, the combination of aluminum flakes and transparent color pigment provides a luminous "live" color effect which creates an impression quite different from that of ordinary painted surfaces.

The paraxial rays (b) are shown striking the outer surface of an exposed sphere at a substantial angle to the normal, with the result that the rays converge close to an axial point on the side under-surface of the sphere, and are reflected and colored by the binder layer. The colored reflected rays return toward the angularly positioned light source in the manner just described for normally incident rays. This accounts for the "reflex" reflection characteristic.

When viewed by daylight, the reflector surface has a continuous colored appearance of about the same hue, but the color is darker.

The nature of the invention will further appear from the description of the following illustrative specific example in connection with which a discussion will be given of the results produced by changing the proportions and other variables.

Example

This example illustrates the making of a weather-proof, flexible and stretchable film type of reflex reflector sheeting of the kind shown in Fig. 2, adapted to be manufactured in continuous web form and supplied in rolls, which may be readily cut into sheets or shapes of desired configuration for affixing to base surfaces in the making of signs and markers. All parts are by weight.

The carrier web is prepared from a highly calendered hard-surfaced paper (such as a 70 lbs. per ream Fourdrinier paper) which is knife-coated with a 40% solution of isobutyl methacrylate polymer in xylol solvent in the amount of about 13 to 16 grains per 24 sq. in. (wet weight) followed by drying (15 minutes at 120° F. is suitable). This coating adheres tenaciously to the paper and provides a smooth casting surface for the subsequent coating operations.

The back size coating of the reflector sheet is then cast in two steps. The dried paper is first knife-coated with a 10% solution of polyvinyl butyral polymer (for example, the XYNC or XYSG grade of "Vinylite" sold by Carbide & Carbon Chemicals Corp.) in ethylene-glycol monoethyl-ether solvent, in the amount of about 20 grains per 24 sq. in. (wet weight), followed by oven drying (one hour at 140° F. is suitable). This provides a back surface which facilitates dry-stripping from the paper carrier web. The second step is to apply a coating solution containing 12.5% of the polyvinyl butyral polymer and 4.2% of tricresyl phosphate plasticizer in the same solvent, in the amount of about 40 to 45 grains per 24 sq. in. (wet weight), followed by oven drying (5 minutes each at 160°, 220° and 300° F., successively, is suitable).

The back reflector coating is then cast, using a wet coating weight of 12 to 14 grains per 24 sq. in. of the following formulation:

| | |
|---|---|
| Solution of thermo-setting urea-formaldehyde resin in volatile solvent (50% solids) | 61.5 |
| Heavy blown castor oil (plasticizer) | 30.8 |
| Ethylene-glycol monoethyl-ether (solvent) | 5.0 |
| Blue phthalocyanine pigment | 7.7 |
| Aluminum pigment (40XD grade) | 5.0 |

This reflector coating is dried and cured by heating in an oven for 10 minutes at 160° F., 15 minutes at 280° F., and 15 minutes at 235° F., successively.

The binder layer is then applied by knife-coating the same formulation, using a wet coating weight of 12 to 17 grains per 24 sq. in. A portion of the solvent is removed from the applied coating by heating for 3 minutes at 225° F. With the coating still in an uncured and plastic condition, transparent glass beads of approximately 1.90 refractive index and of No. 11 size (average diameter of about 5 to 7 mils) are applied to form a single packed layer, the excess being removed, and are pressed into the binder by passing the coated sheet between a pair of squeeze rolls (one being steel and the other rubber-covered). The beaded sheet is then given a final oven cure of 10 minutes at 240° F., and 90 to 120 minutes at 195–205° F. Any surplus beads adhering to the surface can be removed by passing the web around a roller and subjecting the beaded surface to the action of a rotary brush and air blast. Each embedded bead is contacted by the binder to somewhat above its middle, providing a mechanical socketing to increase firmness of anchorage.

The reflector sheet can be stripped from the paper carrier web and the latter can be reused, the reflector sheet being fully self-sustaining. Typical reflector films, made as described, have a tensile strength of 7 to 10 lbs. per inch width and a stretch value (at rupture) of 20 to 30%. When the illumination direction is at angle of 40° to the normal, the reflex reflection brilliancy is 85% as high as for normal (perpendicular) incidence, showing the excellent wide angularity characteristic. The reflex-reflection (nighttime) appearance is light blue, and the daylight color is a deep grey-blue.

With further reference to the above-mentioned formulation of the reflective coatings (back reflector and bead binder), an example of a commercially available urea-formaldehyde resin solution is the No. 227-8 grade of "Beetle," sold by American Cyanamid Co., which is a 50% by weight solution of thermosetting urea-formaldehyde resin in a volatile solvent composed of 60 parts butyl alcohol and 40 parts xylol. An example of a blue phthalocyanine pigment is the "Monastral" Blue Toner BT-172-D, sold by E. I. du Pont de Nemours & Co.

The phthalocyanine pigments, toners and lakes, are insoluble and each serves as a pigment, in contradistinction to soluble phthalocyanine dyes. This class of coloring agents is described in an article in Industrial and Engineering Chemistry, July, 1939, pages 839-847. The invention is not limited thereto. The use of transparent color pigments in printing inks is well known and various suitable pigments are available, including various lake-type pigments. The color pigment should be as light-fast as possible so as to minimize bleaching out of the color in reflectors subjected to continuous outdoor exposure.

In making up the pigmented coating compositions, the preferred procedure is to prepare a color pigment concentrate by milling the color pigment with sufficient of the castor oil to provide about a 20% by weight concentration, thereby separating and dispersing the pigment particles. This pigment concentrate can then be mixed in the proper ratio with the remaining ingredients to make up the ultimate formulation used for coating.

Taking the foregoing formulation of the reflective coatings as a reference point, the effect of variations will now be briefly indicated as follows:

In the above formulation the weight percent of the aluminum pigment relative to the total of resin solids plus castor oil (which provides the transparent film body of the dried coatings) is 8.13%. The weight percent of the blue color pigment is 12.5%. Thus each type of pigment is present in the dried reflective coating in a plural percent proportion which is smaller than the proportion of the transparent film body material (by weight relative to the total of transparent film body material plus pigments); the proportion of aluminum flake pigment on this basis being 6.7% and that of the transparent blue color pigment being 10.4%. Increasing the color pigment ratio deepens the color but decreases the reflex-reflection brilliancy value (as measured by a photo-electric cell). Decreasing the color pigment ratio increases brilliancy but weakens the color intensity (chroma). Increasing the aluminum pigment ratio increases the reflex-reflection brilliancy but weakens the color, and vice versa. A further effect of variation is that the degree of divergency of the reflected rays is somewhat increased by decreasing the color pigment ratio or by increasing the aluminum pigment ratio. It is evident that a proper correlation of pigment ratios is required for the most desirable balance of visibility and color appearance properties. The optimum numerical value of the color pigment ratio depends of course upon the particular pigment being used, since pigments vary as to hue and as to absorption, depending both on the composition of the pigment and the particle size.

The 40XD grade of aluminum flake pigment mentioned in the formulation has a particle size of about 0.3 mil (i. e. the flakes will pass through a screen opening having a breadth of approximately 0.0003 inch). This is far larger than the size of the color pigment particles, which are of colloidal size, but is much smaller than the size of the glass beads. The use of large aluminum flakes results in a decrease of reflex-reflection brilliancy and the color deepens, comparing equal weight percentages.

The refractive index of the glass beads is a highly critical factor. The optimum value is close to 1.90. Increasing the value to 1.95 decreases brilliancy and greatly weakens the color effect. Decreasing the value to 1.85 deepens the color but considerably decreases the brilliancy.

Considerable variation in bead size does not appreciably affect the optical properties within a size range (average diameter) of about 3 to 10 mils. The use of these small beads provides a relatively smooth outer front surface (adapted to be painted or printed in making signs) and permits of a very thin and pliable reflector sheet. The number of such beads per square inch of a single layer exceeds 10,000.

The expedient shown in Fig. 2 of using two separate reflective coatings (23 and 24) is not essential to the invention. The back reflector coating 23 can be omitted without resulting in dead spots behind the spheres provided that the spheres are embedded in the binder coating 24 so as not to penetrate to the back surface thereof, thereby allowing the back extremities of the spheres to be adequately covered with the coating composition to provide reflection for normally incident rays. However, the illustrated expedient is advantageous for factory production as proper control is more easily secured.

It is also possible to employ the principle of the invention in other specific types of construction. For example, if back reflector coating 23 contains aluminum pigment without the color pigment being present, the reflex-reflection appearance will be silvery for normally incident light beams, but will have the colored appearance for angularly incident light due to the color pigment in the binder coating 24.

The aluminum flake pigment is a preferred species of reflective metallic flake pigment but it will be understood that other species can be used as equivalents in keeping with the principles of the invention. For example, a yellow bronze flake pigment may be used in combination with a transparent yellow color pigment, in making a reflector having a clear yellow color. If aluminum flake pigment is used with transparent yellow color pigment a greenish cast is imparted to reflected light owing to the silvery reflection characteristic of aluminum.

It will be understood that each class of pigment may consist of a blend of two or more specifically different pigments. For example, a mixture of aluminum flake pigment and bronze flake pigment may be used as the metallic flake pigment constituent. Mixtures of transparent color pigments of differing hues may be used. The transparent film body of the reflective layers may be tinted by a dye to modify the coloration, and tinted spheres may be used for the same purpose. Such combinations permit of additional variations in the color appearances of the reflex reflector.

Having described various embodiments of the invention, for purposes of illustration rather than limitation, what is claimed is as follows:

1. A reflex light reflector having a single layer of minute transparent spheres, whose refractive index is approximately 1.9, partially embedded in a reflective layer contacting the inner surfaces of the spheres, forming a catadioptric combination, said reflective layer being formed of a transparent film body material admixed with smaller but plural percent proportions (by weight relative to the total) of reflective metallic flake pigment and transparent color pigment, the metallic flakes being oriented in proximity to each embedded sphere surface so as to face toward it, and the proportions of the pigments being correlated, as herein described, so as to provide effective coloration and high brilliancy of reflex-reflected light.

2. A reflex light reflector according to claim 1, wherein the transparent color pigment is a lightfast phthalocyanine pigment.

3. A reflex light reflector according to claim 1, wherein the spheres are glass beads having an average diameter in the range of about 3 to 10 mils, and the metallic pigment consists of aluminum flakes having a size of the order of 0.3 mil.

4. A reflex light reflector sheet including a flat back reflector layer, an overlying reflective binder coating, and a single layer of transparent glass beads partially embedded therein so as to closely approach the back reflector, the glass beads having a refractive index close to 1.90 and an average diameter in the range of about 3 to 10 mils, said reflector layer and binder coating being each composed of a clear transparent film material intimately admixed with smaller but plural percent proportions (by weight relative to the total) of reflective metallic flake pigment and transparent color pigment, the metallic flakes being oriented in proximity to each embedded sphere surface so as to face toward it, and the proportions of the pigments being correlated, as herein described, so as to provide effective coloration and high brilliancy of reflex-reflected light both for normally and angularly incident light beams.

5. A reflex light reflector sheet according to claim 4, wherein the metallic pigment consists of aluminum flakes having a size of the order of 0.3 mil and the transparent color pigment is a lightfast phthalocyanine pigment.

JOHN C. TATUM.

REFERENCES CITED

The following references are of record in the file of this patent:

UNITED STATES PATENTS

| Number | Name | Date |
|---|---|---|
| 2,302,305 | Farrell | Nov. 17, 1942 |
| 2,326,634 | Gebhard et al. | Aug. 10, 1943 |
| 2,354,049 | Palmquist | July 18, 1944 |
| 2,379,702 | Gebhard | July 3, 1945 |
| 2,379,741 | Palmquist | July 3, 1945 |
| 2,383,884 | Palmquist | Aug. 28, 1945 |
| 2,407,680 | Palmquist et al. | Sept. 17, 1946 |
| 2,440,584 | Heltzer et al. | Apr. 27, 1948 |